(12) United States Patent
Deng et al.

(10) Patent No.: US 11,769,978 B2
(45) Date of Patent: Sep. 26, 2023

(54) ASSEMBLY SYSTEM

(71) Applicants: Tyco Electronics (Shanghai) Co. Ltd., Shanghai (CN); TE Connectivity Corporation, Berwyn, PA (US); Kunshan League Automechanism Co., Ltd., Kunshan (CN)

(72) Inventors: Yingcong Deng, Shanghai (CN); Dandan Zhang, Shanghai (CN); Lvhai Hu, Shanghai (CN); An Yang, Shanghai (CN); Jian Cao, Shanghai (CN); Yun Liu, Shanghai (CN); Roberto Franciso-Yi Lu, Bellevue, WA (US); Yuting He, Kunshan (CN); Haidong Wu, Kunshan (CN); Hui Xiao, Kunshan (CN)

(73) Assignees: TE Connectivity Solutions GmbH Tyco, Schaffhausen (CH); Electronics (Shanghai) Co., Ltd., Shanghai (CN); Kunshan League Automechanism Co., Ltd., Kunshan (CN)

(*) Notice: Subject to any disclaimer, the term of this patent is extended or adjusted under 35 U.S.C. 154(b) by 405 days.

(21) Appl. No.: 16/701,648

(22) Filed: Dec. 3, 2019

(65) Prior Publication Data
US 2020/0176941 A1   Jun. 4, 2020

(30) Foreign Application Priority Data
Dec. 3, 2018 (CN) .......................... 201811465525.7

(51) Int. Cl.
*H01R 43/00* (2006.01)
*H01R 43/20* (2006.01)
*B25J 9/00* (2006.01)
*H01R 43/18* (2006.01)
*H01R 13/506* (2006.01)

(52) U.S. Cl.
CPC ............ *H01R 43/20* (2013.01); *B25J 9/0084* (2013.01); *H01R 43/18* (2013.01); *H01R 13/506* (2013.01)

(58) Field of Classification Search
CPC ...... H01R 43/048; H01R 43/18; H01R 43/20; H01R 13/506; B25J 9/0084; B25J 15/0052
See application file for complete search history.

(56) References Cited

U.S. PATENT DOCUMENTS

| | | | | |
|---|---|---|---|---|
| 5,522,691 | A | * 6/1996 | Anderson | H01R 43/01 414/781 |
| 6,628,886 | B2 | * 9/2003 | Sommer | B24B 19/226 385/134 |
| 8,832,934 | B2 | * 9/2014 | Larisch | B25J 9/1687 29/842 |
| 10,155,311 | B2 | * 12/2018 | Nakamura | B25J 9/1633 |
| 2004/0266276 | A1 | * 12/2004 | Hariki | H01R 43/26 439/894 |
| 2007/0096315 | A1 | * 5/2007 | Manens | B23H 5/08 257/737 |

(Continued)

*Primary Examiner* — Paul D Kim
(74) *Attorney, Agent, or Firm* — Barley Snyder

(57) ABSTRACT

An assembly system includes a robot, a first gripper mounted on the robot, the first gripper gripping a first housing, and a first clamping device clamping a cable and a contact connected to an end of the cable. The robot moves the first gripper and assembles the first housing gripped by the first gripper onto the contact held by the first clamping device.

19 Claims, 8 Drawing Sheets

(56) References Cited

U.S. PATENT DOCUMENTS

2020/0067255 A1\* 2/2020 Takeyama .............. B25J 13/085
2020/0156249 A1\* 5/2020 Ueda ...................... B25J 9/1674
2021/0197363 A1\* 7/2021 Zimmer .................. B25J 15/04

\* cited by examiner

ASSEMBLY SYSTEM

CROSS-REFERENCE TO RELATED APPLICATION

This application claims the benefit of the filing date under 35 U.S.C. § 119(a)-(d) of Chinese Patent Application No. 201811465525.7, filed on Dec. 3, 2018.

FIELD OF THE INVENTION

The present invention relates to an assembly system and, more particularly, to an assembly system adapted to assemble a housing onto a contact.

BACKGROUND

In order to facilitate an electrical connection of a cable to an electronic device, a connector is connected at an end of the cable. The cable may be connected to the electronic device quickly and conveniently through the connector. The contact of the connector is usually pressed onto the end of the cable, and then the housing of the connector is assembled on the contact. Sometimes, before assembling the housing onto the contact, it is necessary to bend the contact by an angle, for example, 90 degrees. In the related art, bending the contact and assembling the housing onto the contact are usually completed manually, which reduces the assembly efficiency and quality.

SUMMARY

An assembly system includes a robot, a first gripper mounted on the robot, the first gripper gripping a first housing, and a first clamping device clamping a cable and a contact connected to an end of the cable. The robot moves the first gripper and assembles the first housing gripped by the first gripper onto the contact held by the first clamping device.

BRIEF DESCRIPTION OF THE DRAWINGS

The invention will now be described by way of example with reference to the accompanying Figures, of which.

DETAILED DESCRIPTION OF THE EMBODIMENT(S)

Figure 1:
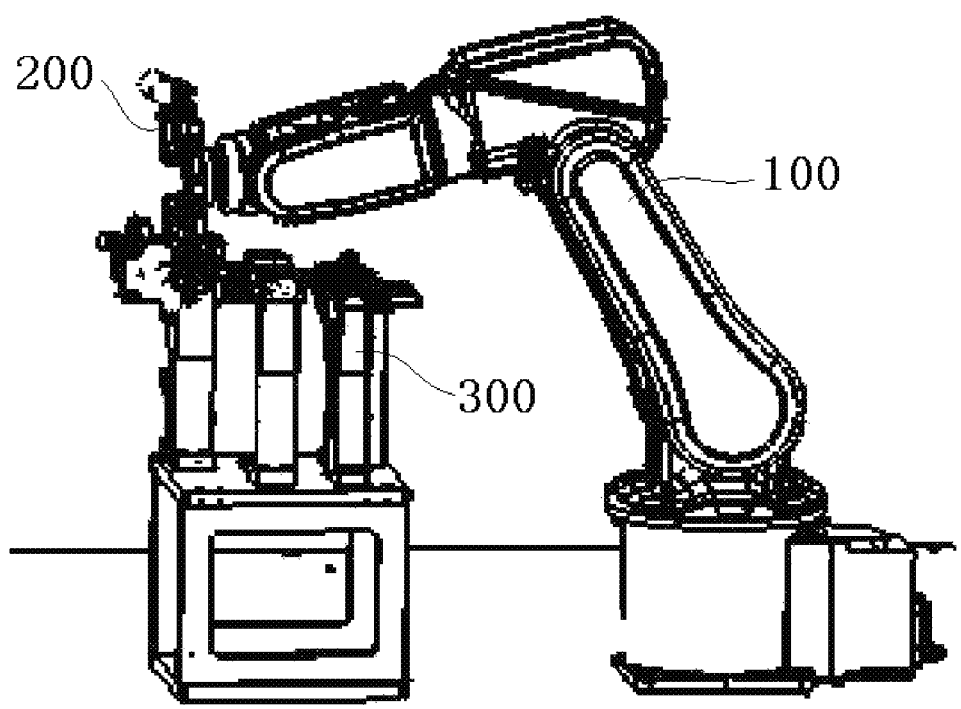
FIG. 1 is a perspective view of an assembly system according to an embodiment.

Exemplary embodiments of the present disclosure will be described hereinafter in detail with reference to the attached drawings, wherein like reference numerals refer to like elements. The present disclosure may, however, be embodied in many different forms and should not be construed as being limited to the embodiment set forth herein; rather, these embodiments are provided so that the present disclosure will convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

An assembly system according to an embodiment, as shown in FIGS. 1-4, comprises a robot 100, a first gripper 210, and a first clamping device 300. The first gripper 210 is mounted on an end flange of the robot 100 and adapted to grip a first housing 10. The first clamping device 300 is adapted to clamp a cable 30 and a contact 40 connected to an end of the cable 30. The robot 100 is adapted to move the first gripper 210 and assemble the first housing 10 gripped by the first gripper 210 onto the contact 40 held by the first clamping device 300. In an embodiment, the robot 100 is a six-axis robot. In other embodiments, the robot 100 may be any suitable multi-degree-of-freedom robot.

Figure 3:
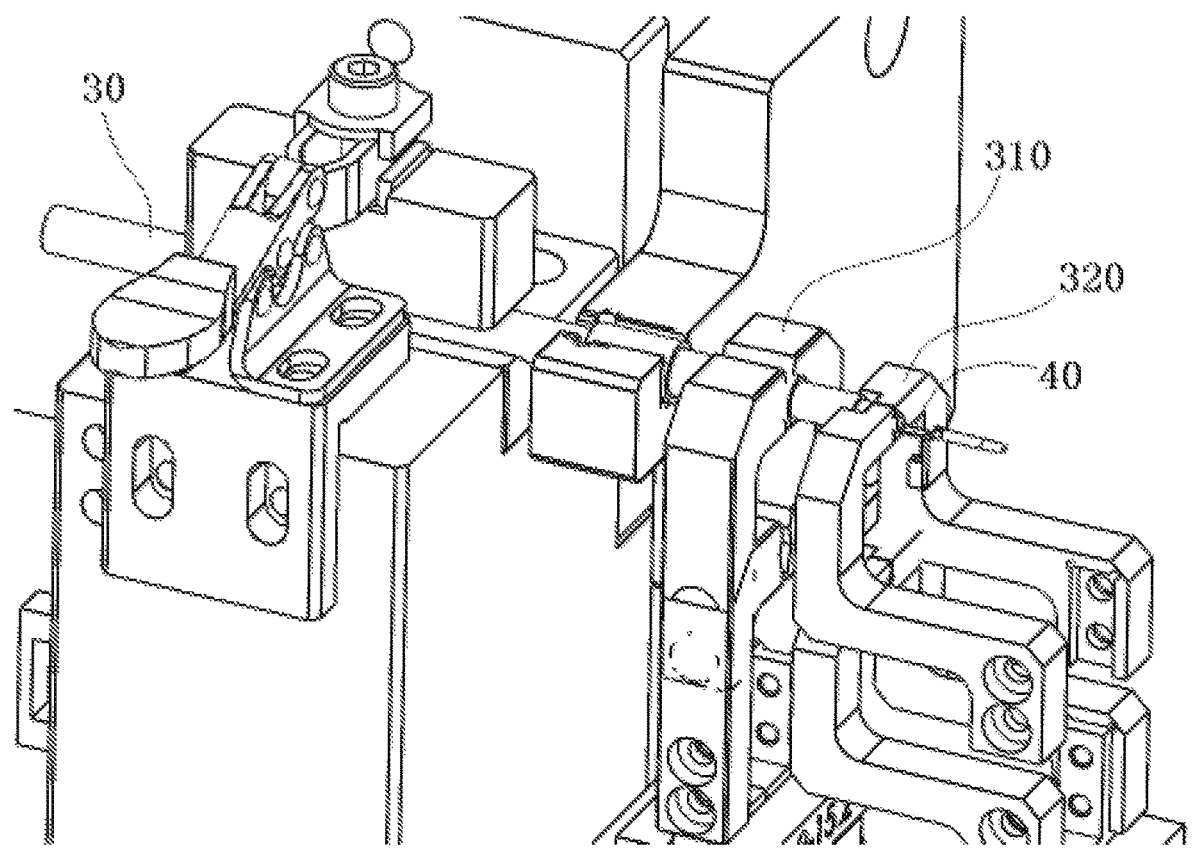
FIG. 3 is a perspective view of a first clamping device of the assembly system.
Figure 4:
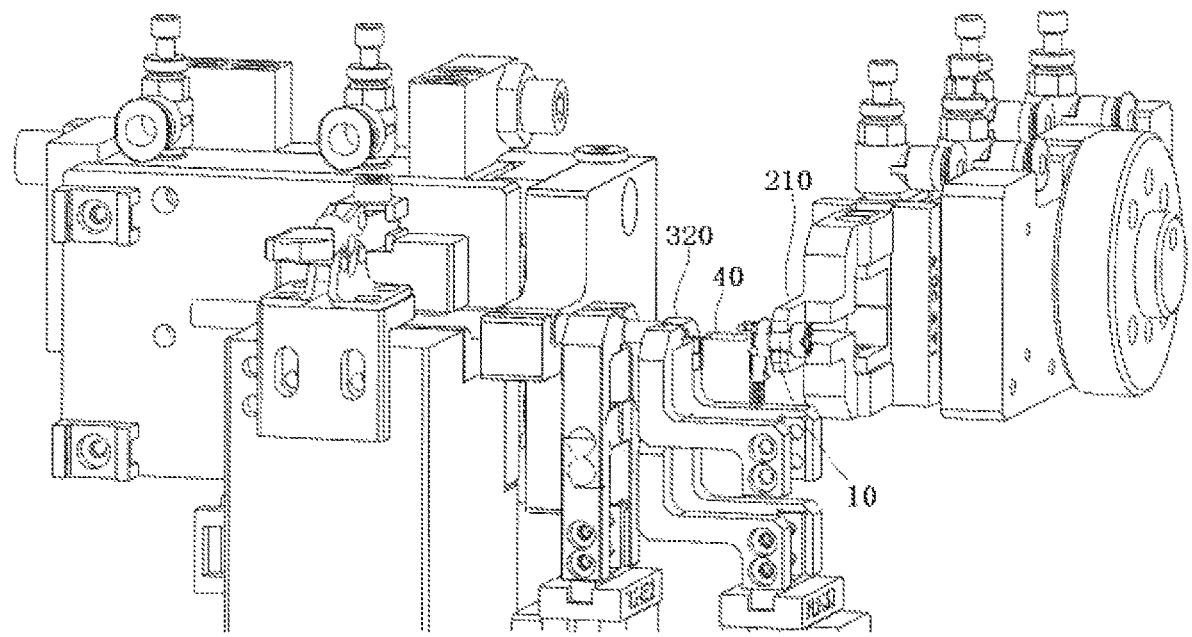
FIG. 4 is a perspective view of assembling a first housing onto a contact of a cable with the robot.

The first clamping device 300, as shown in FIGS. 3 and 4, includes a cable clamp 310 and a contact clamp 320. The cable clamp 310 is adapted to clamp and fix the cable 30. The contact clamp 320 is adapted to clamp and fix the contact 40.

Figure 2:
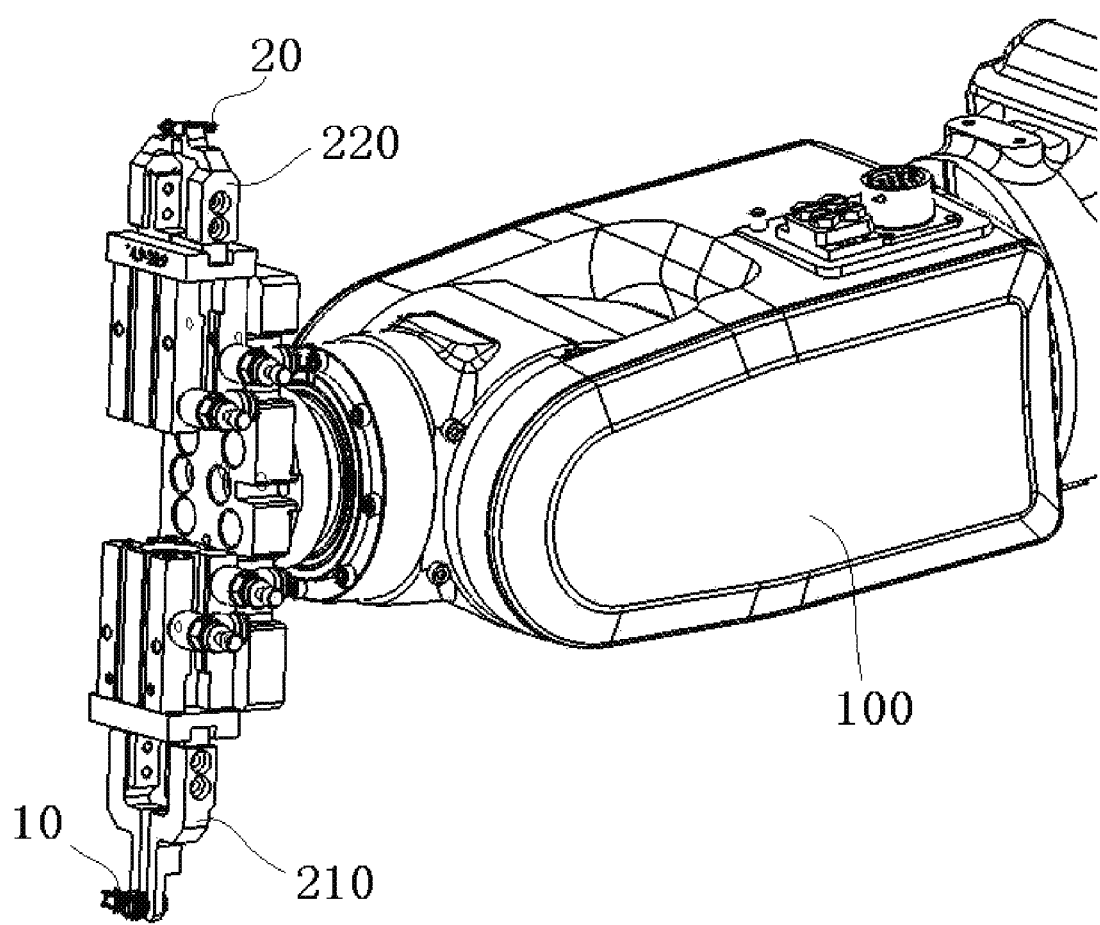
FIG. 2 is a perspective view of a robot and a gripper mounted on an end flange of the robot of the assembly system.

As shown in FIGS. 2-4, the robot 100 is adapted to align a contact slot formed in the first housing 10 with the contact 40 by adjusting the position and posture of the first housing 10 gripped by the first gripper 210. The robot 100 is adapted to insert the contact 40 into the contact slot of the first housing 10 by moving the first gripper 210 in a straight line after aligning the contact slot of the first housing 10 with the contact 40. The robot 100 is adapted to control the depth of the contact 40 inserted into the contact slot of the first housing 10, so that the depth of the contact 40 inserted into the contact slot of the first housing 10 is equal to a preset depth.

Figure 5:
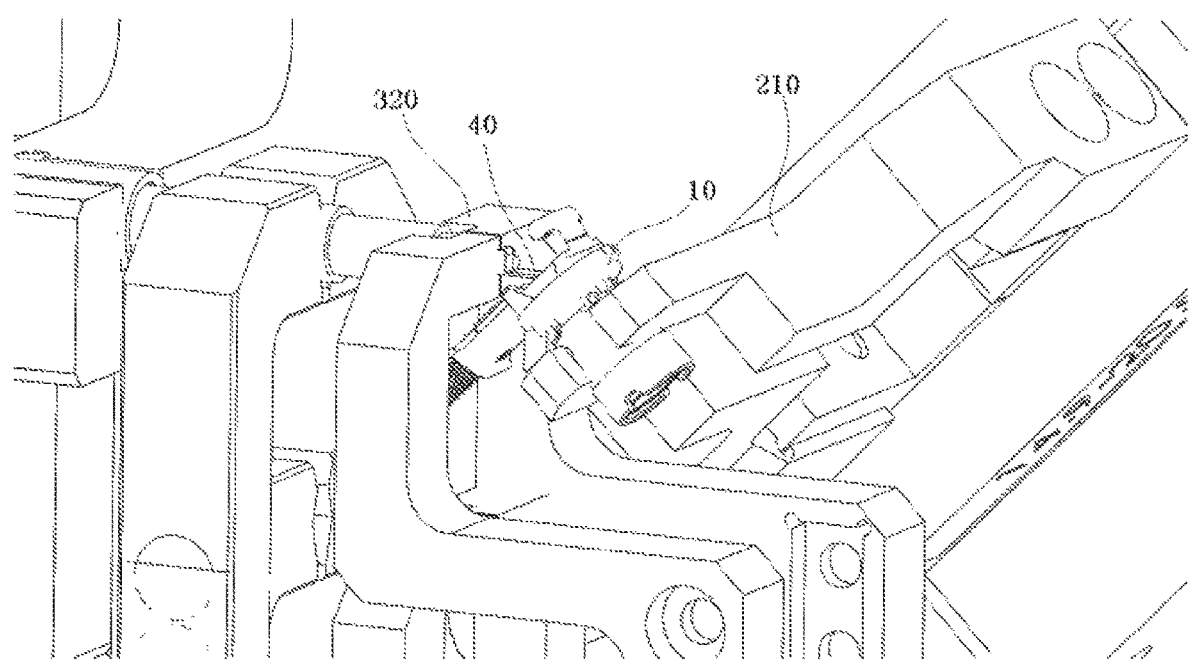
FIG. 5 is a perspective view of bending the contact inserted into the first housing to a first angle with the robot.

As shown in FIG. 5, the robot 100 is adapted to bend the contact 40 inserted into the contact slot of the first housing 10 to a first angle by rotating the first gripper 210 about a first axis after the contact 40 is inserted into the contact slot of the first housing 10. The contact clamp 320 is movable. In this way, after the contact 40 is bent at the first angle, the contact clamp 320 loosens the contact 40 and is moved to a first position where the contact clamp 320 does not interfere the robot 100 with continuing to bend the contact 40.

Figure 6:
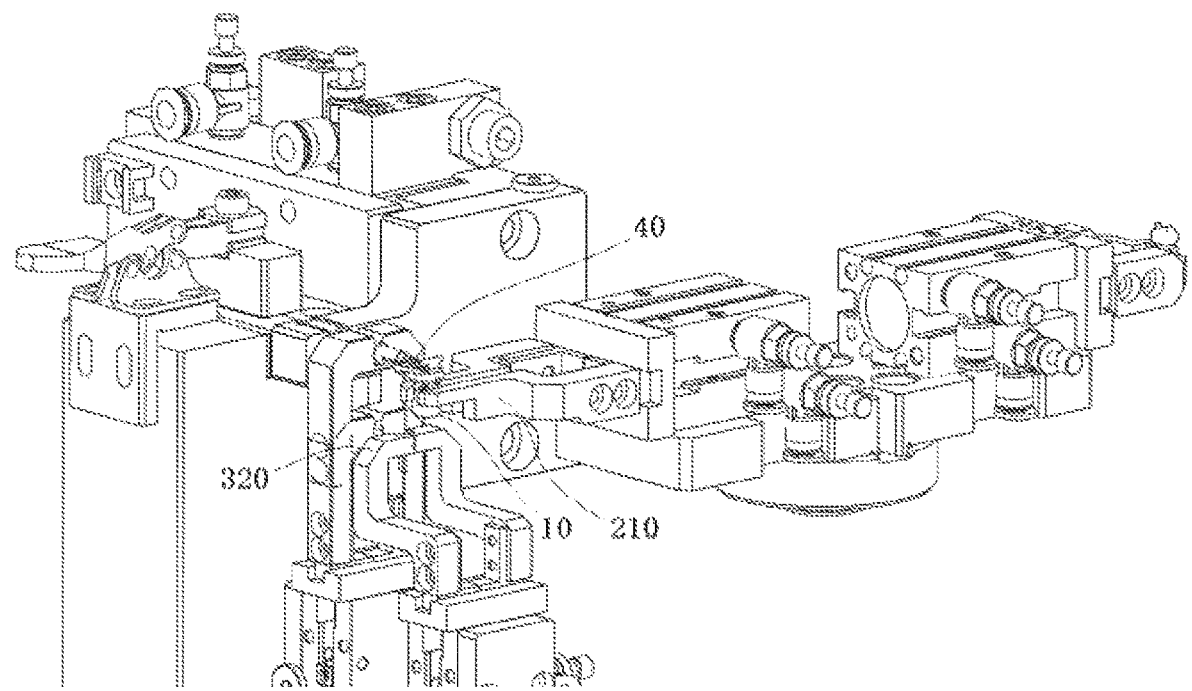
FIG. 6 is a perspective view of bending the contact inserted into the first housing to a second angle with the robot.

As shown in FIG. 6, after the contact clamp 320 is moved to the first position where the contact clamp 320 does not interfere the robot 100 with continuing to bend the contact 40, the robot 100 continues rotating the first gripper 210 about the first axis, so that the contact 40 inserted into the contact slot of the first housing 10 is bent to a second angle larger than the first angle. In an embodiment, the first angle is within a range of 30-50 degrees, and the second angle is within a range of 60-120 degrees. In an embodiment, the first angle is equal to about 40 degrees, and the second angle is equal to about 90 degrees.

Figure 7:
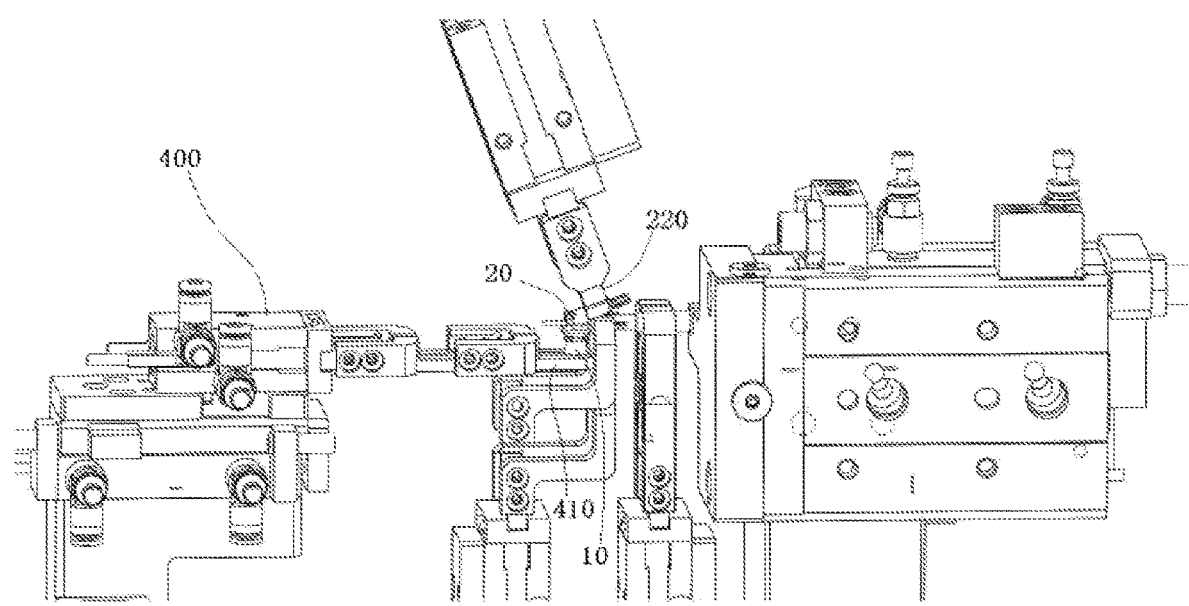
FIG. 7 is a perspective view of assembling a second housing onto the first housing.

The assembly system, as shown in FIGS. 2 and 7, comprises a second gripper 220. The second gripper 220 is mounted on an end flange of the robot 100 and adapted to grip a second housing 20. The robot 100 is adapted to assemble the second housing 20 onto the first housing 10 after the first housing 10 is assembled onto the contact 40.

As shown in FIG. 7, the first housing 10 and the second housing 20 are adapted to be locked together by matching a first snap feature formed on the first housing 10 with a second snap feature formed on the second housing 20. The robot 100 is adapted to align the second snap feature of the second housing 20 with the first snap feature of the first housing 10 by adjusting the position and posture of the second housing 20 gripped by the second gripper 220. The robot 100 is adapted to assemble the second housing 20 onto the first housing 10 by moving the second gripper 220 in a straight line after aligning the second snap feature of the second housing 20 with the first snap feature of the first housing 10.

The assembly system, as shown in FIG. 7, comprises a second clamping device 400, which is adapted to clamp the first housing 10 after the first housing 10 is assembled onto the contact 40. After the second clamping device 400 holds the first housing 10, the robot 100 loosens the first housing 10 and assembles the gripped second housing 20 onto the first housing 10 by moving the second gripper 220.

As shown in FIG. 7, the second clamping device 400 includes a housing clamp 410 being movable between a clamping position and an initial position and a driving mechanism adapted to drive the housing clamp 410 to move. After the first housing 10 is assembled onto the contact 40, the housing clamp 410 is moved to the clamping position and holds the first housing 10. After the second housing 20 is assembled onto the first housing 10, the housing clamp 410 loosens the first housing 10 and is moved to the initial position far away from the first housing 10.

Figure 8:
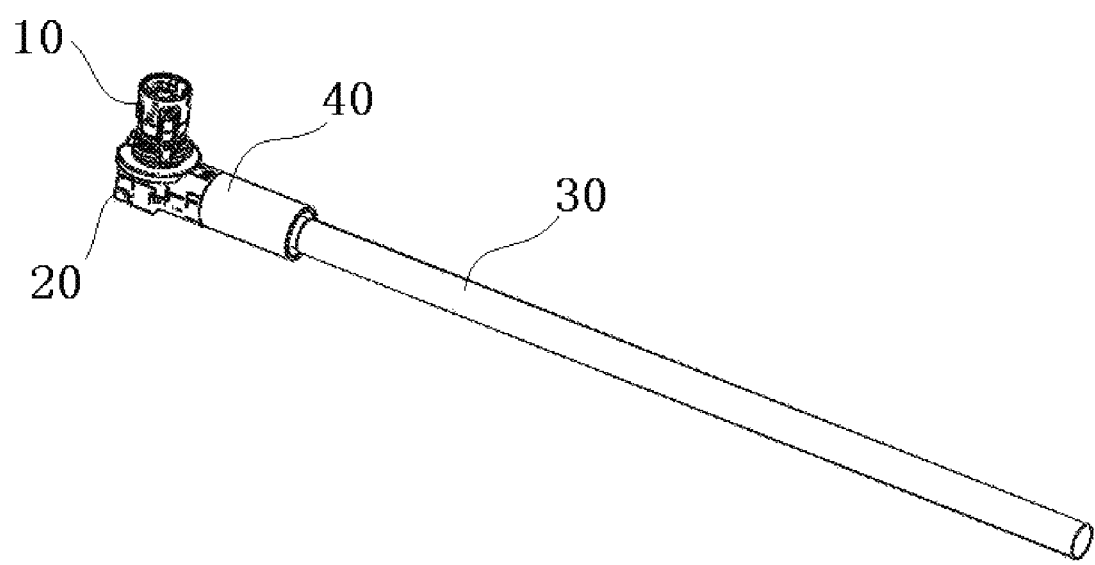
FIG. 8 is a perspective view of the first housing and the second housing assembled onto the contact of the cable.

The first housing 10 and the second housing 20 are shown assembled onto the contact 40 of the cable 30 in FIG. 8. As shown in FIG. 8, after assembling the first housing 10 and the second housing 20 onto the contact 40 of the cable 30, a connector comprising the contact 40, the first housing 10 and the second housing 20 is formed at the end of the cable 30. The connector may be inserted into an electronic device in a direction perpendicular to the cable 30, and the connector may be referred to as a right angle connector. The assembly system automatically assembles the housings 10, 20 onto the contact 40, and bends the contact 40 precisely to a predetermined angle, thus improving the assembly efficiency and quality of the connector.

It should be appreciated for those skilled in this art that the above embodiments are intended to be illustrative, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

What is claimed is:

1. An assembly environment, comprising:
   a first housing;
   a second housing; and
   an assembly system, including:
      a robot;
      a first gripper mounted on the robot, the first gripper gripping the first housing;
      a second gripper mounted on the robot and gripping the second housing; and
      a first clamping device clamping a cable and a contact connected to an end of the cable, the robot moves the first gripper and assembles the first housing gripped by the first gripper onto the contact held by the first clamping device, the robot moves the first housing relative to the contact to insert the contact into the first housing and bends the contact inserted into the first housing to a first angle by rotating the first gripper about a first axis.

2. The assembly environment of claim 1, wherein the first clamping device includes a cable clamp clamping and fixing the cable and a contact clamp clamping and fixing the contact.

3. The assembly environment of claim 2, wherein the robot aligns a contact slot of the first housing with the contact by adjusting a position and posture of the first housing gripped by the first gripper.

4. The assembly environment of claim 3, wherein the robot moves the first housing relative to the contact to insert the contact into the contact slot of the first housing by moving the first gripper in a straight line after aligning the contact slot of the first housing with the contact.

5. The assembly environment of claim 4, wherein the robot controls a depth of the contact insertion into the contact slot of the first housing to be equal to a preset depth.

6. The assembly environment of claim 4, wherein the contact clamp is movable, after the contact is bent at the first angle the contact clamp loosens the contact and is moved to a first position where the contact clamp does not interfere with the robot continuing to bend the contact.

7. The assembly environment of claim 6, wherein after the contact clamp is moved to the first position, the robot continues rotating the first gripper about the first axis and bends the contact inserted into the contact slot to a second angle larger than the first angle.

8. The assembly environment of claim 7, wherein the first angle is within a range of 30-50 degrees and the second angle is within a range of 60-120 degrees.

9. The assembly environment of claim 7, wherein the first angle is equal to 40 degrees and the second angle is equal to 90 degrees.

10. The assembly environment of claim 1, wherein the robot assembles the second housing onto the first housing after the first housing is assembled onto the contact.

11. The assembly environment of claim 10, wherein the first housing and the second housing are locked together by a first snap feature on the first housing engaging a second snap feature on the second housing.

12. The assembly environment of claim 11, wherein the robot aligns the second snap feature with the first snap feature by adjusting a position and posture of the second housing gripped by the second gripper.

13. The assembly environment of claim 12, wherein the robot assembles the second housing onto the first housing by moving the second gripper in a straight line after aligning the second snap feature with the first snap feature.

14. The assembly environment of claim 10, further comprising a second clamping device clamping the first housing after the first housing is assembled onto the contact.

15. The assembly environment of claim 14, wherein, after the second clamping device clamps the first housing, the robot loosens the first housing and assembles the second housing onto the first housing by moving the second gripper.

16. The assembly environment of claim 15, wherein the second clamping device includes a housing clamp movable between a clamping position and an initial position, and a driving mechanism driving the housing clamp to move.

17. The assembly environment of claim 16, wherein, after the first housing is assembled onto the contact, the housing clamp is moved to the clamping position to hold the first housing.

18. The assembly environment of claim 17, wherein, after the second housing is assembled onto the first housing, the housing clamp loosens the first housing and is moved to the initial position at a distance from the first housing.

19. The assembly environment of claim 1, wherein the robot is a six-axis robot.

\* \* \* \* \*